United States Patent [19]
Jonsson

[11] Patent Number: 5,915,224
[45] Date of Patent: Jun. 22, 1999

[54] TELECOMMUNICATIONS METHOD FOR MULTI-NETWORK COMMUNICATIONS

[75] Inventor: Björn Erik Rutger Jonsson, Järfälla, Sweden

[73] Assignee: Telefonaktiebolaget LM Ericsson, Stockholm, Sweden

[21] Appl. No.: 08/991,659

[22] Filed: Dec. 16, 1997

Related U.S. Application Data

[63] Continuation of application No. 08/262,886, Jun. 21, 1994.

[30] Foreign Application Priority Data

Jun. 22, 1993 [SE] Sweden ................................. 9302161

[51] Int. Cl.$^6$ ........................................................ H04Q 7/20
[52] U.S. Cl. ........................... 455/552; 455/414; 455/417; 455/553; 379/210
[58] Field of Search ..................................... 455/414, 417, 455/426, 432, 435, 436, 459, 461, 524, 525, 552, 553; 379/201, 210–212

[56] References Cited

U.S. PATENT DOCUMENTS

5,655,003  8/1997  Erving et al. ............................ 455/435

*Primary Examiner*—Dwayne D. Bost
*Assistant Examiner*—Nay Maung
*Attorney, Agent, or Firm*—Burns, Doane, Swecker & Mathis, L.L.P.

[57] ABSTRACT

The present invention relates to a multinetwork communication method for telecommunication in an environment which includes a number of different telecommunications networks, using a multinetwork terminal intended for communication in the various telecommunications networks. The invention is characterized in that the multinetwork terminal (25) itself detects those telecommunications networks to which it has access. On the basis of predetermined decision criterions, the multinetwork terminal itself decides in which of the accessible telecommunications networks communication shall take place. The invention also relates to a multinetwork terminal having a control unit (32) and network switching means controlled by the control unit for activation of communication devices (30, 31) in the selected telecommunications network.

7 Claims, 7 Drawing Sheets

⚲ = fixed access point

TELECOMMUNICATIONS METHOD FOR MULTI-NETWORK COMMUNICATIONS

This application is a continuation of application Ser. No. 08/262,886, filed Jun. 21, 1994.

TECHNICAL FIELD

The present invention relates to telecommunications in a multinetwork environment through one and the same terminal or by coordinated use of a number of accessible separate terminals. The invention provides a user with access to the communication services of the various networks in a unitary fashion.

The terminology used in this document is defined below:
Mobile Terminal/Mobile Network A network which includes a fixed infrastructure, which includes, among other things, a number of fixed stations which provide a mobile terminal with access to a mobile network by radio communication. The fixed stations are spread geographically over a metropolitan area (metropolitan area network, MAN) or over a wide land area (wide area network, WAN). Examples of mobile networks include mobile telephony networks, mobile data such as mobitex. A mobile terminal is able to move freely over the whole of the land area covered by the mobile network.
Cordless Terminal/Fixed Network A network having a fixed infrastructure and including, among other things, a number of fixed nodes which are mutually connected through the medium of lines or other conductor means. A cordless terminal has access to the fixed network at an access point. Examples of a fixed network include the telephone network, the telex network, a circuit switched data network, a packet switched network, such as datapack, teletex, videotex and datel. The cordless terminal is connected by means of a "virtual cable" to a base unit which, in turn, is connected to the access point. The virtual cable is implemented with devices for communication with radio, infrared light or ultrasound. A cordless terminal can move locally around the access point. Thus, a cordless terminal is able to move solely within a small "island" defined by the area covered by the base unit and not within the fixed network formed by the nodes.

The access point, normally a jack, is either an individual access point or a common access point. An individual access point is intended for the cordless terminal, e.g. a cordless telephone, of an individual user. A common access point, also referred to as a shared access point, is common to several cordless terminals belonging to different users. A plurality of common access points together form a local network (local area network, LAN). Examples of common cordless access points include business cordless and radio LAN.

BACKGROUND ART

Different types of telecommunications networks are known to the art. The typical telephone network offers telephony services. The telex network offers the telex communications service. A circuit switched data network offers data communications services, the paging network offers the paging service. The typical telecommunications network can be used as a carrier for other services, such as telex and data transmission, for instance. The packet switched network may be a carrier of different services, such as Datapack, Teletex, Videotex and Datel. Traffic in one network can be adapted for communication to destinations in another network, by introducing gateways or ports in the first-mentioned network. ISDN (Integrated Services Digital Network) is an integrated service network which is able to offer several of the aforesaid services. The subscribers connect all of their equipment to the same "wire pair" in ISDN.

A user will traditionally use different equipment, hereinafter called terminals, and different procedures to obtain access to different networks. The function of the terminal is to make the services of the network available to the user. A given terminal has the functionality for interaction with a given network, the functionality for interaction with a user, and the functionality of coordinating the behaviour of the terminal to the user and the behavior of the terminal to the network. User interaction with the terminal is different and will depend on the network to which the terminal has access. This means that the user must be aware of the access procedure for each of those networks with which he wishes to communicate through his different terminals. This means in practice that one access procedure is used when telephoning, that another access procedure is used when using a mobile telephone, and that a third access procedure is used when wishing to page a subscriber. The supplementary services of a telephone network can be utilized by dialling or keying a specific key sequence. The same supplementary service, for instance unconditional call forwarding or conditional call forwarding, have different key sequences in different networks.

A common feature of all telecommunications networks is that they enable a connection to be established between two subscribers. Different networks are able to set up a connection between two terminals in the different networks, even when one network A cooperates with another network B through a port. On the other hand, none of the telecommunications networks is aware of why the connection is established between two terminals. Such knowledge lies beyond the makeup of the networks. Thus, if a subscriber X wishes to communicate with a subscriber Y and subscriber Y is located in a third network C which is different from A and B, none of the networks A or B is able to initiate the setup of a connection to subscriber Y in the network C.

A user Y who can be accessed in several different networks has a number of possibilities from which to choose in present-day techniques. Most typically the user Y does nothing, implying that a calling party X will have to search the called subscriber Y by making a number of calls in each of those networks that subscriber Y believes that subscriber X can be found. Another possibility for the user Y is to control incoming traffic to his/her/its present destination, by activating some form of redirection or diversion in one or in a number of the networks. In the following redirection and diversion are used as synonymous terms.

KNOWN TECHNIQUES

The mobile telephone network and the standard telephone network cooperate with one another to some extent. A mobile telephone owner called on his mobile telephone directory number can elect to divert incoming calls in the mobile telephone network to a directory number associated with a fixed telephone in the standard telephone network. The reverse is also possible, of course, namely diversion to a mobile telephone directory number of incoming calls which use the directory number of the fixed telephone as an address. However, the two networks, the mobile telephone network and the standard telephone network, also offer diversion services independently of each other.

Each individual network registers where the called user Y wishes to be reached from that moment in time. When the called user wishes to change this diversion in conjunction with a change in communication conditions, for instance the user has left home, this is no trivial task, since it is necessary for the user to keep an account of the earlier diversions that he has ordered in the different networks.

Networks which support mobile users offer a fixed network infrastructure which includes nodes to which mobile terminals register their presence. The mobile terminals register their presence in different ways, depending on the type of mobile network concerned. In the mobile telephone network, the mobile telephone itself registers its presence when obtaining radio contact with a base station. In the case of a business-cordless network, registration is effected by a handportable telephone when the telephone obtains radio contact with a stationary base unit. A user is normally limited to solely outgoing calls in a telepoint network.

When a mobile terminal has registered its presence to a fixed node in a network, the network will register the node in which the mobile terminal is located at that moment in time, and the registered data is then used as a basis for routing calls to the mobile terminal. A call to the directory number of the mobile terminal is routed to the fixed node in which the mobile terminal is registered at that moment in time, and the call is redirected from this node to the mobile terminal via radio transmission. Current positions of the mobile terminal are updated, by repeatedly registering successive locations of the terminal as it moves from place to place in the network.

A fixed terminal which can be used by a mobile user is an alternative to mobile terminals. In this case, it is necessary to redirect the directory number of the called user to the physical location of the fixed terminal at which the called user is registered at that moment in time. It is the responsibility of the mobile user to annul an earlier registration when he leaves the fixed terminal, and to register with a new fixed terminal when changing his geographical position.

The U.S. Pat. No. 4,989,230 and 5,127,042 describe a mobile cordless telephone which includes circuits for communication with a cordless base station, circuits for communication with a mobile telephone base station and a microprocessor which is programmed to operate the mobile cordless telephone, either as a mobile telephone, a cordless telephone or as a mobile cordless telephone. This latter operating mode enables the user to proceed with two conversations at the same time, a first conversation with a user over the fixed telephone network and a second with a user over the mobile telephone network. This latter operational mode can be supplemented with the supplemental service "Conference Call", therewith enabling all three parties to converse together. The user must himself decide which preference the cordless telephone part shall have over the mobile telephone part, both in the case of outgoing calls and incoming calls. This is done by keying-in a predetermined number of key sequences on the telephone keypad. The mobile cordless telephone enables implementation of the services "Call forwarding" and "Call waiting". If a call is in progress on the cordless telephone and an incoming call is detected, the incoming call can only be diversed to the mobile telephone part when the user has earlier keyed-in the key sequence that corresponds to the call diversion service in the fixed telephone network. Conversely, the user himself must key-in a key sequence corresponding to the diversion of calls in the mobile telephone network if he wishes to be able to receive a call on the mobile telephone part while a call is in progress on the cordless telephone part at the same time.

One drawback with this known arrangement is that the user himself must decide whether a call shall be made on the cordless telephone part or on the mobile telephone part. Another drawback is that it is the user's responsibility to handle the necessary call diversions between the different networks and to mutually coordinate these call diversions. The user must employ a strict discipline in keeping an account of the diversions that have previously been made and which diversions must be annulled under all circumstances, in order for the arrangement to function in the desired manner.

Still another drawback with the known arrangement is that the cordless part and the mobile telephone part are activated for communication simultaneously, resulting in high current consumption.

SUMMARY OF THE INVENTION

The present invention relates to a communications arrangement which includes equipment for communication in a number of different telecommunications networks. The invention also relates to a communications method which when applied to the inventive communications arrangement automatically selects the telecommunications network which at that moment is most dedicated for communication with the communications arrangement. The invention also relates to a communications arrangement which registers automatically a mobile terminal that belongs to the communications arrangement, in the network selected by the arrangement. The communications arrangement manages diversion of incoming calls which as a destination use a directory number in one of the aforesaid number of different networks, to the network in which the mobile terminal is registered at that moment, without initiative on the part of a user.

The invention also relates to a communications method and to a communications arrangement which mutually coordinates the call diversion services in said number of different networks.

The invention also relates to a communications arrangement which provides access to one and the same service in said number of different networks, in response to a user keying-in one and the same key sequence.

The invention also relates to a communications arrangement which produces an "intelligent" link between said different numbers of communications network, by diverting a call directed to a directory address in one of the aforesaid number of networks to that network in which the mobile terminal is registered, on the basis of predetermined decision criteria.

According to one preferred embodiment of the invention, this automatic diversion of calls to the selected network is effected in conjunction with placing the mobile terminal in or removing the mobile-terminal from a battery-charging unit by means of which the batteries of the mobile terminal are charged. This means that the user of the mobile terminal need only worry about the care of the batteries of the mobile terminal. In conjunction with connecting the mobile terminal to the battery-charging unit, or disconnecting the terminal from said unit, the requisite registrations are made in respective host networks automatically, and the necessary diversion of calls incoming from the remaining networks is effected, i.e. all networks with the exception of the network in which the mobile terminal is registered. The procedure of placing a mobile terminal in a terminal-charging unit can be easily made a habit, since a user knows that the batteries must be recharged in order to be able to use the mobile terminal. Furthermore, this is the only procedure that a user need observe, since remaining registration and call diversion procedures are initiated automatically in conjunction with placing the mobile terminal in and removing the terminal from the battery-charging unit.

The features characteristic of the present invention are set forth in the following claims.

The invention is based on the principle of the communications arrangement itself deciding which networks are accessible at the time a call is made in a traffic originating purpose. The communications arrangement is programmed with decision criteria for network selection in the case of outgoing calls and for terminal selection in the case of incoming calls.

Figure 1:
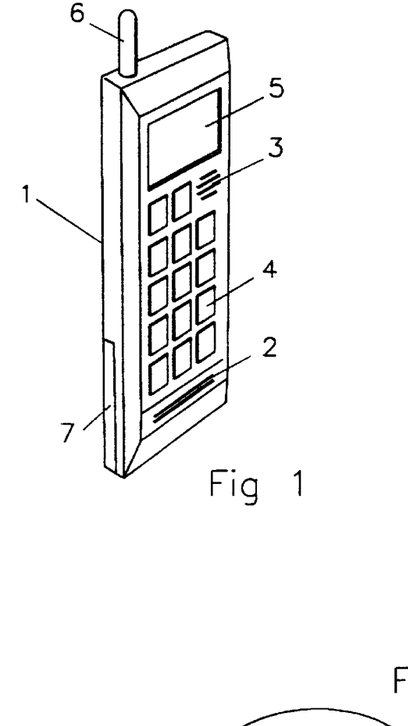
FIG. 1 illustrates a first exemplifying embodiment of a multinetwork terminal in the form of a multinetwork telephone.

FIG. 1 illustrates a first exemplifying embodiment of a multinetwork terminal in accordance with the invention. The multinetwork terminal includes a handportable multinetwork telephone 1 which provides communication in both a mobile telephony network and in a fixed network having cordless access points. The multinetwork telephone includes a microphone 2, a loudspeaker 3, a keypad 4, a digit window 5, a multiantenna 6 for communication in the two types of network, and a battery 7. The telephone casing houses electronics for implementing circuits which provide communication in the two networks. More specifically, the electronics include a first communicating device 8 (shown in the block schematic of FIG. 2) having mobile telephony functions, a second communication device 9 having cordless communication functions towards a base unit which has a fixed access point to the telephone network. Certain functions may be common to the two communication devices. The first device 8 includes a transmitter and receiver for communication with a base station in a mobile telephony network. The mobile telephony network has access to the fixed telephone network. The second device 9 includes a transmitter and receiver for communication with a base unit which, in turn, has an access point in the telephone network. The access point may be one of two kinds, an individual or a common access point. A common access point is normally a base unit which is connected to a radio exchange (not shown) to which other base units are connected in a business cordless network. The common access point is common to several different users. The radio exchange is, in turn, connected with a private branch exchange, PABX, which, in turn, is connected to the fixed telephone network. An individual access point is normally a jack to which the base unit of a cordless telephone is connected.

Figure 2:
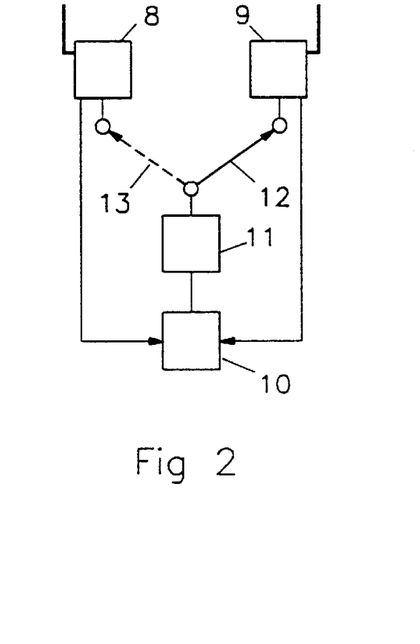
FIG. 2 is a block schematic illustrating the multinetwork telephone of FIG. 1 provided with a network switching arrangement according to the invention.

Each of the first and the second devices 8, 9 include a respective range control circuit, not shown in FIG. 2. Each range control circuit activates a detector circuit 10 which establishes whether or not the multinetwork telephone is located within the range of a base station in the mobile telephony network and/or a base unit in the business cordless network. A signal which corresponds to one of the three possible cases: Contact with the mobile telephony network, contact with the business cordless network, contact with the mobile telephony network and with the business cordless network is sent to a network switching circuit 11. On the basis of predetermined decision criteria, the network switching circuit 11 determines in which of the two networks the multinetwork telephone shall communicate. The network switching circuit 11 controls a switch 12 which activates either the first device 8 or the second device 9 for communication in either the mobile telephony network or in the business cordless network, but not in both at the same time. Because only one of the communication devices 8, 9 is activated for communication, but not both at the same time, current consumption is kept low, therewith saving the battery 7. The network switching circuit 11 activates the second communication device 9 for cordless telephony when the detector circuit 10 detects that either solely the range control circuit in the second device 9, or both range control circuits in the first and the second devices 8, 9 have contact with a respective base unit in the business cordless network and with its respective base unit in the business cordless network and a base station in the mobile telephony network. When the range control circuits detect that a handportable multinetwork telephone is located solely within the range of one base station in the mobile telephony network, the network switching circuit 11 activates the first device 8 for mobile telephony.

In the FIG. 2 illustration, the second device 9 is shown activated for communication. The range control circuit in the first device 8 is not activated, but sends registration signals to the nearest base station. The user is able to receive calls and to make outgoing calls via cordless access to the telephone network, but can neither receive calls nor make calls in the mobile telephony network. When the switch 12 is in the position shown by the broken-line arrow 13, the first device 8 is activated for communication in the mobile telephony network. The second device 9 is then inactive for communication, but sends continuously registration signals to its base unit. The user is able to receive calls and to make calls in the mobile telephone network, but can neither receive nor make calls via the cordless access point to the telephone network.

Figure 3:
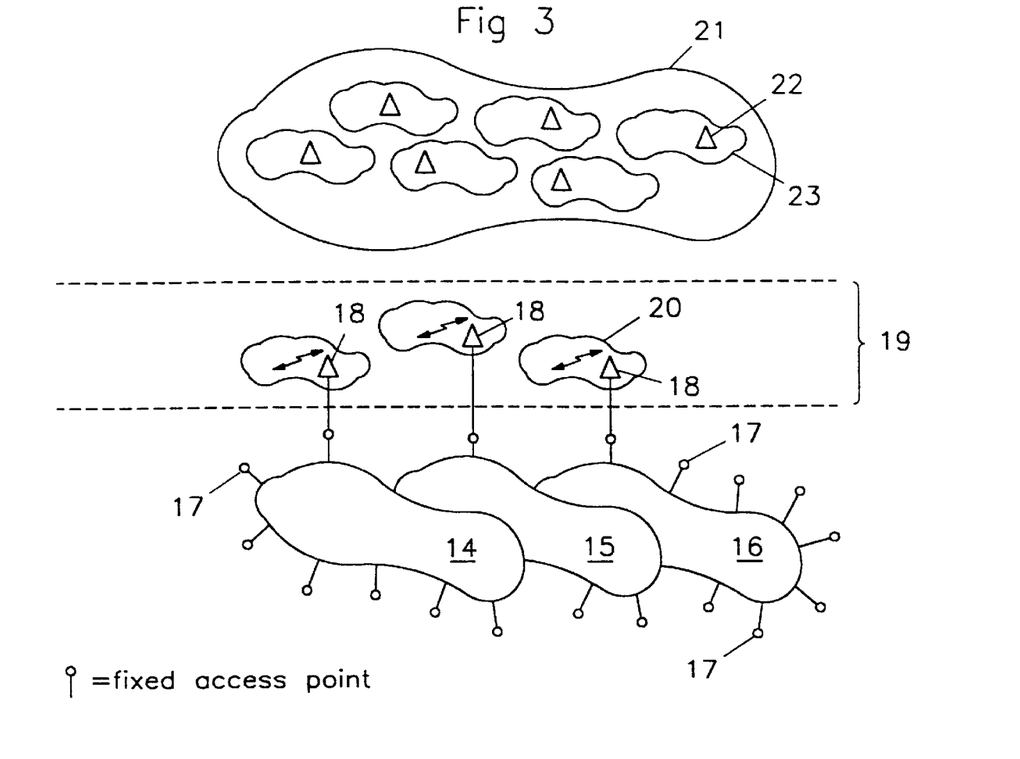
FIG. 3 illustrates a mobile telephone network which includes a number of fixed networks having cordless accesses.

FIG. 3 illustrates the network environment in which the multinetwork telephone in FIG. 1 is used. A number of business cordless networks 14, 15, 16 are shown at the bottom of the Figure. Each network has a number of fixed access points 17 and a base unit 18 is arranged at each of the access points. For reasons of clarity, only one base unit in each network is shown in FIG. 3. The base units are located in different locations of a building for instance, so as to form together a local coverage area 19 for the multinetwork telephone 1. Each base unit has a coverage area 20 whose size will vary from base unit to base unit. For instance, the networks 14, 15, 16 can be located on respective floors of one and the same building. The local coverage area 19 is then within the building. Another example is one in which the networks 14, 15, 16 are located in buildings in geographically distanced regions and in which the buildings, for instance, belong to one and the same company. The local coverage area 19 is then comprised of the coverage areas within respective buildings.

There is shown at the top of FIG. 3 a mobile telephony network 21 which comprises a plurality of base stations 22. Each base station has its own coverage area 23. The base stations are spread over a large geographical area and the mobile telephony network 21 may be national or continent coverage.

Registration

The presence of the user in a business cordless network 14, 15, 16 is registered when the second device 9 of the multinetwork telephone 1 obtains radio contact with one of the fixed base units 18. More specifically, the registration signals are received by a base unit. When a user has registered himself in a business cordless network, he is free to roam in the area covered by the network concerned and to receive calls and also to make calls from his multinetwork telephone. When the user moves from one business cordless network to another, for instance from the network 14 to the network 15, his presence in the new network is registered by virtue of the multinetwork telephone obtaining radio contact with one of the base units 18 in the new network. When this has occurred, the user is able to move freely within the coverage area of the new network, this area comprising the coverage areas of base units 18 that belong to the new network. Thus, there is a number of local coverage areas within which the user can move and receive incoming calls and make outgoing calls with his hand-portable multinetwork telephone 1. The network switching circuit 11 maintains the second device 9 activated for communication, provided that the range control circuits in the device 9 detect that the multinetwork telephone is located within the coverage area of a base unit, and all communication takes place within one of the business cordless networks 14, 15 or 16. When the detector circuit 10 detects that the second device 9 is no longer in contact with a base unit 18, the network switching circuit 11 breaks the activation of the second device 9 and instead activates the first device 8 for mobile telephony, wherein the switch 12 takes the position illustrated by the broken-line arrow 13. The first device sends registration signals, irrespective of the setting of the switch 12, which signals are received by a base station 22 in the mobile telephony network 21. The user therewith registers in the mobile telephony network in a known manner, and can now move within the coverage area 23 of the base station 22 in which the communication arrangement is registered and is able to receive calls and to make calls himself. The user is able to move from the coverage area 23 of one base station to the coverage area of another base station in a known manner, and the mobile telephony network will handle the registration automatically in the new base station. This enables the user to move within the coverage area of the mobile telephony network and to receive calls and himself make calls. All communication is effected over the mobile telephone equipment, provided that the multinetwork telephone 1 is located within the coverage area of the mobile telephony network but outside the local coverage areas of the business-cordless networks. Thus, the user need not himself choose which network and which equipment he should use, but that one and the same apparatus, i.e. the multinetwork telephone, is used for access to both networks. For instance, a user equipped with the multinetwork telephone may be located in an office building and use within the building cordless access points to the telephone network in which the user moves locally within the building. When the user leaves the building and is located outside the local coverage area 19, the multinetwork telephone will automatically switch to communication via the mobile telephony network without any manual manipulation on the part of the user.

Diversion

The fixed telephone network (not earlier shown) can provide access to such services as unconditional, call forwarding, call forwarding on busy, call waiting, automatic recall, wake-up service and reminder service. Several of these services can also be found implemented in the mobile telephony network 21. The services must be activated, i.e. called-in separately in the different networks, however.

Figure 4:
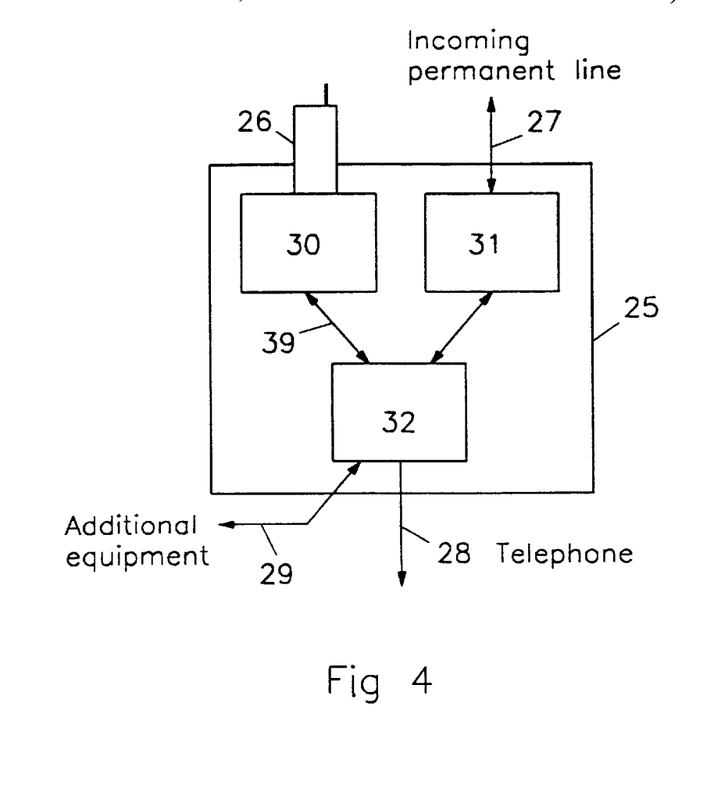
FIG. 4 is a block schematic illustrating a second embodiment of a multinetwork terminal which includes a network switching arrangement according to the invention.

According to the invention, it is possible to handle services in the two networks, the fixed telephone network and the mobile telephony network, in a coordinated manner, with the aid of a communications system shown in FIG. 4. According to the present invention, when the activation of a service in a network presumes procedures with one or more services in another network, these procedures shall be initiated automatically with the aid of the inventive multinetwork terminal.

FIG. 4 illustrates a second exemplifying embodiment of an inventive multinetwork terminal 25. The multinetwork terminal 25 includes a conventional handportable battery-supply mobile telephone 26 for communication in the mobile telephony network, an incoming fixed line 27 from the fixed telephone network an outgoing line 28 to a fixed telephone, and a second outgoing line 29 for connecting supplementary or auxiliary equipment to the incoming fixed line 27. This auxiliary equipment may be in the form of a telefax apparatus, a telephone answering machine, an additional fixed telephone set, the base unit of a cordless telephone, a computer modem, or a number of these devices and apparatus. The multinetwork terminal 25 includes three main blocks, namely a first function block 30, a second function block 31 and a third function block 32 which includes the network switching circuit 11 shown in FIG. 2. The first function block 30 handles functions to/from the mobile telephone and detects the status thereof. The status of the mobile telephone may be that it is engaged, unoccupied, that the telephone is seated in a battery-charging unit, or that the mobile telephone is not seated in a charging unit. The telephone may also have other statuses. The second function block 31 handles functions to/from the fixed incoming line and detects the status of said line, meaning that the function block 31 detects whether the fixed line is engaged or unoccupied. The third function block 32, hereinafter called the control unit, coordinates and controls the use of the mobile telephone 26, the fixed telephone and any supplementary or auxiliary equipment that may be connected. The control unit 32 detects the status of the function blocks 30 and 31 and also detects and handles incoming calls to the blocks 30, 31 and detects whether or not corresponding equipment is unoccupied. The control unit 32 shall also detect when a call has been terminated. The control unit 32 is also operative in allocating an outgoing call to one of the function blocks 30 or 31, which detect that corresponding equipment, i.e. the mobile telephone or the fixed telephone, is unoccupied. When a call occurs on block 30 or block 31, the call is switched to the fixed telephone or, when applicable, to the supplementary equipment. Outgoing calls can be established via either the mobile telephone network or the fixed telephone network when the mobile telephone is seated in a battery-charging unit, not shown in FIG. 4. The control unit 32 is able to select for outgoing calls the network in which it is cheapest to make a call.

When either of the blocks 30 or 31 is engaged with a call, the control unit is able to accept an incoming call or to enable an outgoing call to be established through the other "free" block.

Figure 5:
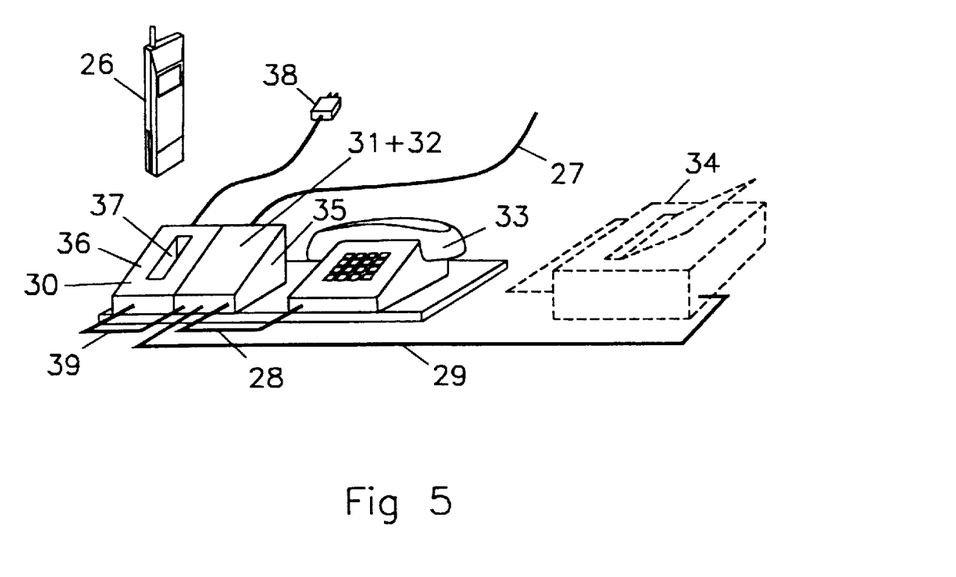
FIG. 5 illustrates a third embodiment of a multinetwork terminal which utilizes the embodiment illustrated in FIG. 4.

FIG. 5 illustrates a multinetwork terminal which includes the multinetwork terminal 25 shown in FIG. 4, the mobile telephone 26, a standard fixed telephone 33 and a telefax apparatus 34. The multinetwork terminal 25 is in the form of a box 35 which accommodates the function blocks 30, 31 and the control unit 32 and also a charging unit 36 for use in charging the battery of the mobile telephone 26. The telephone 26 is intended to be inserted into an opening 37 in the charging unit, so as to charge the battery 7. The charging unit 36 is connected to the mains network by a mains lead and a network contact 38. The box 34 is conceived as being divided into two parts, a first part consisting of the battery-charging unit 36 and the first function 30 having the telephony functions towards the mobile telephone, and a second part which includes the second and the third function units 31, 32. A line 39 represents a galvanic connection between the first and the second parts of the box 35. The galvanic connection 39 is corresponded by the two-directional function arrow 39 in FIG. 4. The user uses the mobile telephone when wishing to move around and the fixed telephone when he is located in its vicinity. When the user returns to the location of the fixed telephone after having roamed around, he places the mobile telephone in the battery-charging unit 36. The battery 7 is therewith charged and the control unit 32 is activated to initiate two procedures: (a) to annul any diversion service that has been activated in the fixed telephone network; and (b) request the diversion of all incoming calls using the directory number of the mobile telephone as an address to the directory address of the fixed telephone 33. The control unit 32 initiates the annulment of any diversion service that may have been activated earlier in the fixed telephone network, by sending, over the fixed telephone network a sequence of tone codes which are identical with the frequencies of the tone codes that would be generated if the same request for annulment was made by a user keying-in a predetermined sequence of keys on his fixed telephone. The control unit 32 initiates the diversion of incoming mobile telephony calls to the fixed telephone 33, by sending over the mobile telephony network a sequence of tone codes which coincide with the sequence of tone codes that would be generated when the same diversion request was made by keying-in a predetermined sequence of keys on his mobile telephone.

The control unit 32 is programmed to initiate two procedures when the mobile telephone is removed from the unit 36: (a) the annulment of a diversion service that may earlier have been activated in the mobile telephony network; and (b) the diversion of incoming calls whose addresses denote the directory number of the fixed telephone to the directory number of the mobile telephone. Annulment of the service is activated by the control unit 32 initiating the transmission over the mobile telephony network of a sequence of tone codes which coincide with the sequence of tone codes that would be generated when the same request for annulment was made by a user keying-in a predetermined sequence of keys on his mobile telephone. Diversion of incoming calls from the fixed telephone network to the mobile telephony network is effected by sending over the telephone network a sequence of tone codes which coincide with the sequence of tone codes that would be generated if the same call diversion request were to be made by a user keying-in a predetermined sequence of keys on his fixed telephone.

The multinetwork terminal illustrated in FIG. 5 functions in this way to coordinate the call diversion services of the two networks, the mobile telephony network and the fixed telephone network, and the user need take no initiative to activate the call diversion services in the different networks. The control unit 32 keeps an account of which diversion services are active and ensures that the two diversion services are not activated simultaneously. The user need only be concerned about following a strict battery-charging procedure, by placing the mobile telephone 26 in the battery-charging unit 36 each time he is in the vicinity of the multinetwork terminal. If this procedure is followed, the call diversion service will be annulled in one of the networks and coordinated with activation of the call diversion service in the other of said networks, and vice versa.

Combined Registration and Call Diversion

Figure 6:
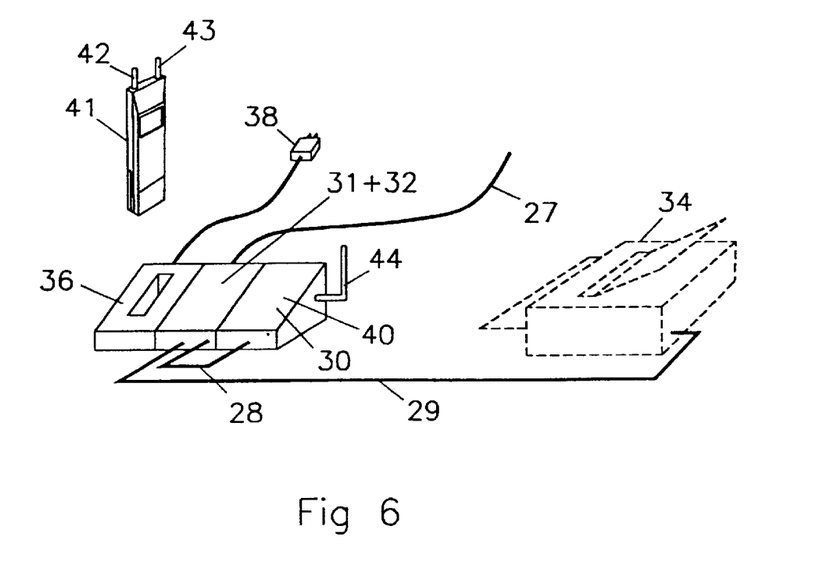
FIG. 6 illustrates a second embodiment of the multinetwork terminal, which utilizes the multinetwork telephone illustrated in FIG. 1.

FIG 6 illustrates a modification of the nultinetwork terminal shown in FIG. 5. In this case, the fixed telephone 33 has been replaced with a cordless telephone having a base unit 40. The cordless telephone is integrated with a mobile telephone, similar to the FIG. 1 embodiment. The second device 9 of the FIG. 2 embodiment is replaced with a device for communication with the cordless telephone in the coverage area of the base unit 40. This results in a second embodiment of the multinetwork telephone 1 in FIG. 1. This second embodiment is referenced 41 and is also referred to as the multinetwork telephone. As shown, the multinetwork telephone 41 has an antenna 42 for communication in the mobile telephony network, and an antenna 43 for communication of the cordless telephone with the base unit 40. The base unit 40 has one antenna, referenced 44. In practice, the antennas 42, 43 on the multinetwork telephone 41 may be integrated to form one single antenna. The embodiment illustrated in FIG. 6 differs from that illustrated in FIG. 5 in that the galvanic connection 35 for transmitting electric signals relating to speech, signalling information, status information between the first function block and the control unit 32, etc., has been replaced with a radio connection, namely the connection between the cordless telephone part and its base unit 40. In this case, the first function block 30 is not housed in the box accommodating the battery-charging unit, but in the base unit 40. An account of the various traffic events that can occur will be given below in conjunction with the description of FIGS. 10–12.

Figure 7:
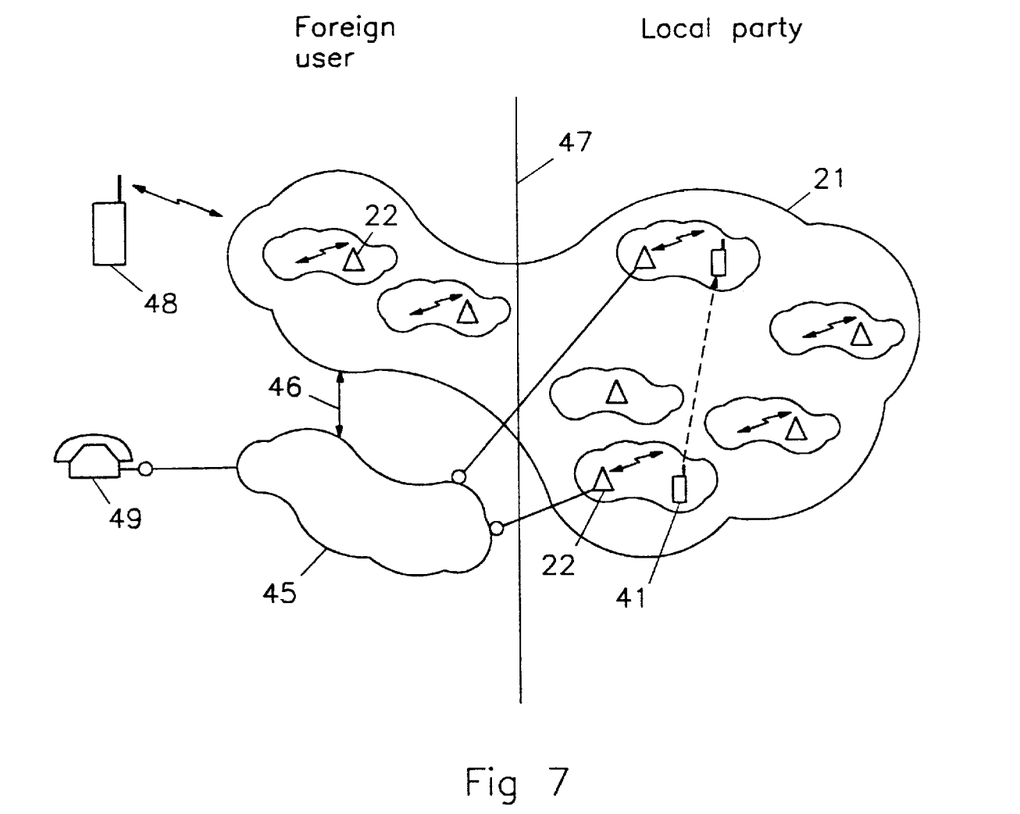
FIG. 7 illustrates a mobile telephone network and a fixed telephone network.

FIG. 7 illustrates an environment for the multinetwork terminal shown in FIG. 6. FIG. 7 also shows the mobile telephony network 21 and a fixed telephone network 45. The mobile telephony network is connected to the fixed telephone network via mobile telephony exchanges, i.e. so-called MSC (mobile switching center). This connection is marked symbolically with a double-headed arrow 46. A foreign user situated to the left of the vertical line 47 has access to the mobile telephone network via a mobile telephone 48, and has access to the fixed telephone network via a fixed telephone 49. A called party, hereinafter referred to as the local party, is situated to the right of the vertical line 47 and is equipped with the multinetwork terminal in FIG. 6. It is assumed in the following that the local party is walking in the environment and can be reached either through the first communication device 8 for mobile telephone communication or via the second communication device 9 for cordless telephone communication. In this latter case, it is assumed that the local party is located within the area covered by the base unit 40. When a foreign user calls the local party, by giving the directory address of the local party in the mobile telephony network, the local party will receive the call on the mobile telephone of the multinetwork telephone when said telephone is located within the range covered by the mobile telephone network, and the detector circuit 10 will detect that the range control circuit in the second communication device 9, i.e. for the cordless telephone, indicates that the local party is situated within the coverage range of the base unit 40. All calls are received by the local party on the cordless telephone part of the multinetwork telephone when the detector circuit 10 detects that both range control circuits indicate presence within each coverage area, or when solely the range control for the second communication device 9 indicates that the multinetwork telephone is located within the coverage area of the base unit 40. A foreign user may also reach the local party, by calling the local party while giving the directory address of the fixed telephone of said local party to whose line 28 the base station 40 is connected. As a result of this diversion, the local party is able to receive the call either on the mobile telephony part or on the cordless part, depending on what is indicated by the range control circuits.

Figure 8:
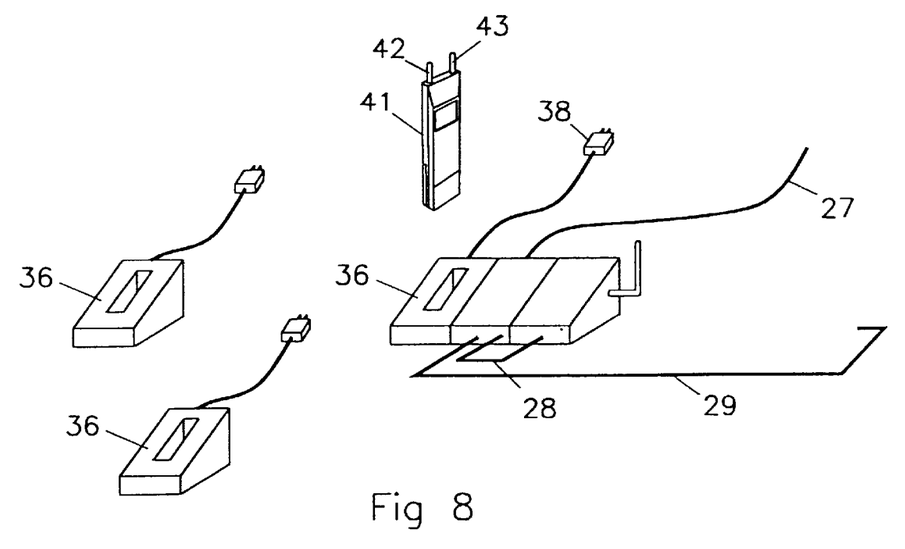
FIG. 8 illustrates a variant of the multinetwork terminal shown in FIG. 6.

FIG. 8 illustrates a variant of the multinetwork terminal in FIG. 6. FIG. 8 shows a number of battery-charging units 36 placed within range of the cordless part of the multinetwork telephone 41. Similar to the FIG. 6 embodiment, the first function block 30 which handles the functions towards the multinetwork telephone is incorporated in the base unit 40. Thus, all battery-charging units 36 function solely as battery chargers. The user may place the telephone 41 in any of the chargers 36 whatsoever and still be available for calls from foreign users, or may himself make a call at the site of the charging unit 36 in which the telephone 41 has been placed for recharging at that moment in time. This further increases the possibilities of foreign users reaching the local user.

Figure 9:
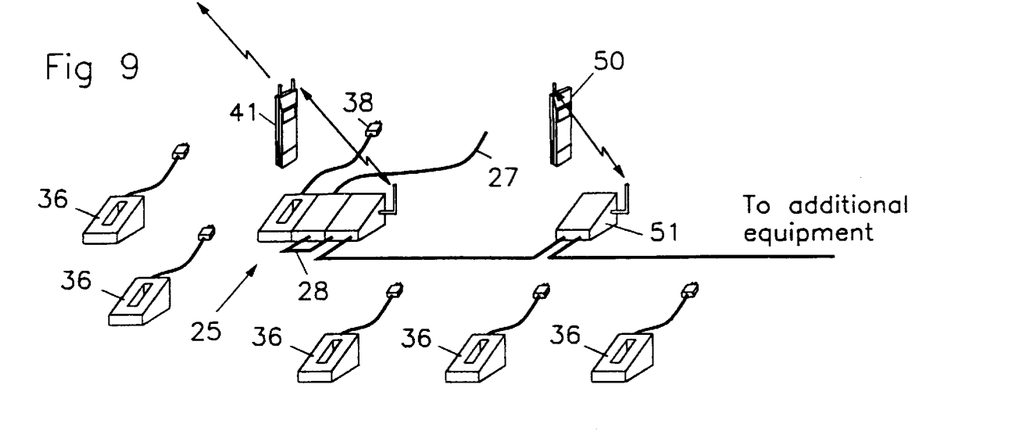
FIG. 9 illustrates another variant of the multinetwork terminal shown in FIG. 6.

FIG. 9 illustrates yet another variant of the multinetwork terminal shown in FIG. 6. FIG. 9 shows a cordless telephone 50 with associated base unit 51 connected to the lead 29 of additional equipment. The Figure also shows a number of battery-charging units 36. The cordless telephone 50 can be placed in any of the charger units 36 whatsoever. It is assumed, however, that the cordless telephone 50 is used solely together with those battery-charger units 36 that lie within the coverage range of the base unit 51. The multinetwork telephone 41 functions as a cordless telephone when it is located within the coverage range of the base unit 40. The cordless telephone 50 functions as a standard telephone when it is located within the coverage range of the base unit 51. It is not necessary for these coverage ranges to overlap one another. By inserting the cordless telephone 50, it is possible for a user to be reached by incoming calls and to himself make outgoing calls, even when he is located outside the coverage range of the base unit 40 in the multiterminal 26.

Call Diversion

Figure 10:
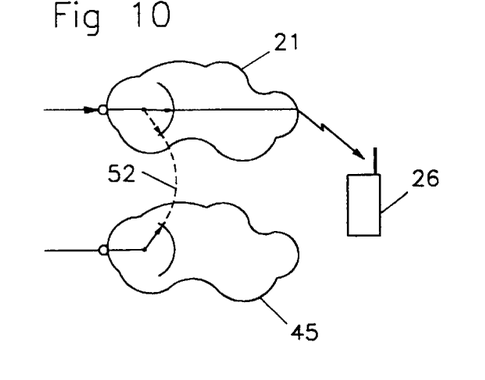
FIG. 10 illustrates a mobile telephone network and a fixed telephone network, and also illustrates the term diversion.

The diversion function and the various traffic incidents that can occur when this service is available both in the mobile telephony network 21 and in the fixed telephone network 45 will now be described. This description is made with reference to the multinetwork terminal shown in FIG. 5, and is also applicable to the embodiments illustrated in FIGS. 6, 8 and 9. When the local party is walking in the environment and is located at a distance from the multinetwork terminal 25 in FIG. 5 or is located within the range of the base unit 40 in FIGS. 6, 8 and 9, incoming calls that give the mobile telephone directory number are routed through the mobile telephony network 21 and are captured by the mobile telephone 26. Incoming calls which are directed to the directory address of the fixed telephone 33 will be switched to the mobile telephone network 21, as indicated by the broken line 52, and are routed through the mobile telephony network 21 to the mobile telephone 26. This call diversion is activated when the mobile telephone 26 is removed from its battery-charging unit 36, or when the multinetwork telephone 41 looses radio contact with its base unit 40. When the local party roams on foot, as shown in FIG. 10, he can only use the mobile telephone for outgoing calls, for obvious reasons.

Figure 11:
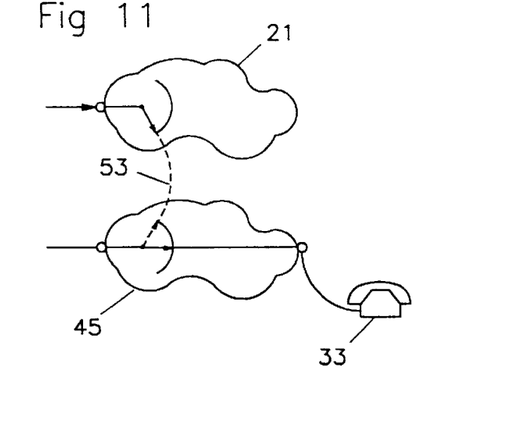
FIG. 11 is a view similar to the view shown in FIG. 10.

FIG. 11 illustrates the traffic event that occurs when the local party is located in the vicinity of the multinetwork terminal 5, or when the cordless part 9 of the multinetwork telephone 41 has radio contact with its base unit 40. A foreign user who calls the local party on the directory address to the fixed telephone 33, is connected through the fixed telephone network, as illustrated by the full line in FIG. 11. A foreign user who calls the local party while using the mobile telephone directory number of the local party as the address will have his call diverted to the fixed telephone network, as shown by the broken line 53.

The call is then routed through the fixed telephone network, to the telephone 33 of the local party. Such call diversion is effected when the mobile telephone 26 is placed in the battery-charging unit 36, or when the cordless part 9 of the multinetwork telephone 41 obtains radio contact with the base 40. When the local party wishes to make an outgoing call, he uses the fixed telephone 33. If the fixed telephone is occupied, the local party is able to make an outgoing call on the mobile telephone 26, provided that this telephone is unoccupied or free.

The fixed states have been described above with reference to the specified traffic cases. The transitions between two fixed states will now be described. Assume that the local party is located in the vicinity of the multinetwork terminal in FIG. 5 and then leaves the vicinity of this terminal and becomes "mobile" and takes with him his mobile telephone 26 or his multinetwork telephone 41. Because the mobile telephone has been removed from the battery-charging unit, the range control will indicate that the multinetwork telephone 41 no longer has contact with its base unit and switching 53 of the mobile telephone in FIG. 11 is annulled and switching 52 of the fixed telephone 33 according to FIG. 10 is activated. A foreign caller calling on the directory number of the fixed telephone 33 will have his call diverted to the mobile telephony network, in the manner indicated by the broken line 52 in FIG. 10. The second type of transition that can occur is when the local party changes from being mobile to becoming stationary or fixed, e.g. enters the room in which the multinetwork terminal in FIG. 5 is located. In this case, diversion of the mobile telephone 26, 53 is activated and diversion 52 of the fixed telephone is annulled. Mobile calls will thus be received on the fixed telephone 33 and any diversion of the fixed telephone that may earlier have been activated is annulled.

A variant of the traffic case in FIG. 11 is one which depends on whether the multinetwork terminal is located in the home of the local party or in the working place of said party. If the multiterminal is located in the home of the local party, the network service "call forwarding on no reply" is not activated until after a predetermined number of ringing signals have sounded and the fixed telephone has not been answered. The call is then diverted from the fixed telephone to the mobile telephony network. This enables members of the family to receive calls. The members of the family are also able to use the fixed telephone in a conventional manner. The user thus has access to an individual telephone at his place of work and a common telephone in his home. On the other hand, if the multinetwork terminal is located at the place of work of the local party, diversion is activated automatically when the mobile telephone or the multinetwork telephone 41 is removed from its battery-charging unit or looses contact with his base unit respectively. In order to enable the same multinetwork terminal to be used in both instances, the fixed telephone 33 or the cordless part 9 of the multinetwork telephone 41 may be provided with a switch which determines whether call diversion to the mobile telephone network shall be activated automatically or not.

Figure 12:
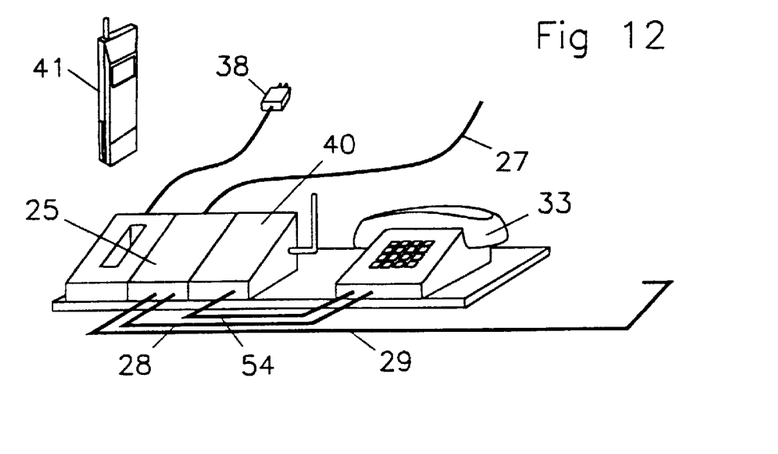
FIG. 12 illustrates a variant of the multinetwork terminal shown in FIG. 6.
Figure 13:
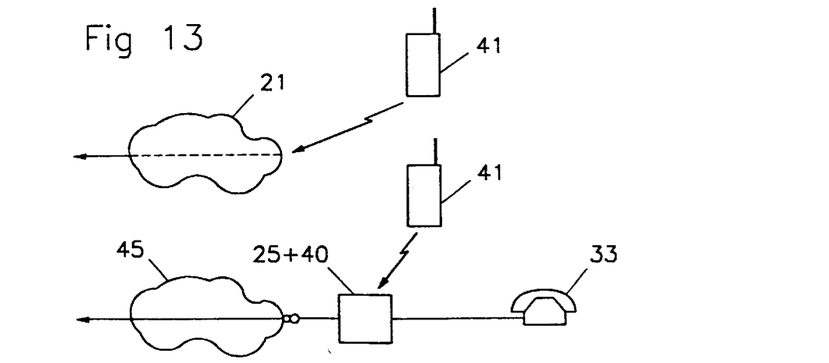
FIG. 13 illustrates a mobile telephone network and a fixed telephone network.

FIG. 12 illustrates yet another variant of the multinetwork terminal shown in FIG. 6. The embodiment illustrated in FIG. 12 is similar to the embodiment shown in FIG. 6 with the exception that a fixed telephone 33 has been connected in series with the base unit 40 by means of a fixed line 54. The fixed telephone 33 and the base unit 40 are mutually connected in series. The embodiment shown in FIG. 10 enables the local user to choose to make calls on either the mobile telephone or on the fixed telephone. This choice is illustrated in FIG. 13. It is assumed in FIG. 13 that the detector circuit 10 detects that the range control circuits indicate presence in both the mobile telephony network and in the covering range of the base unit 40. In other words, the local party is situated in the vicinity of the multinetwork terminal in FIG. 12. Outgoing calls can then be made either through the cordless part of the multinetwork telephone 1 or through the fixed telephone 33. This is indicated in full lines at the bottom of FIG. 13. When the detector circuit 10 detects that solely the range control circuit in the first communication device 8 indicates presence in the mobile telephone network, the control unit 32 activates the first communication device 8 for communication in the mobile telephone network and outgoing calls are made through this network, as illustrated by the broken line at the top of FIG. 13. A complication occurs in the case of outgoing calls when the fixed telephone 33 is occupied, for instance by a member of the family, when the user wishes to make an outgoing call. This complication is solved by the user lifting the multinetwork telephone 41 from its battery-charging unit and then making the outgoing call on the mobile telephone. This is illustrated by the broken line at the top of FIG. 13.

Figure 14:
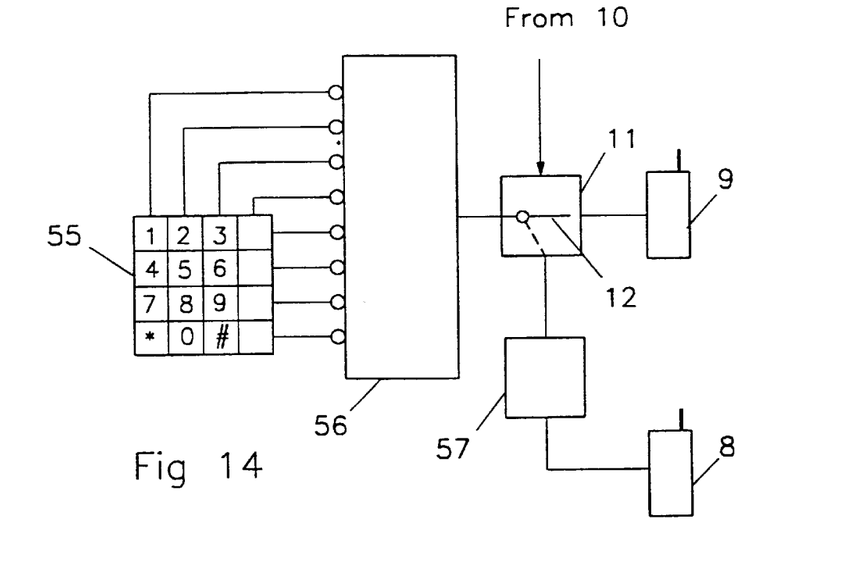
FIG. 14 is a block schematic illustrating a code converter circuit for translating a sequence of DFTM-tones.
Figure 15:
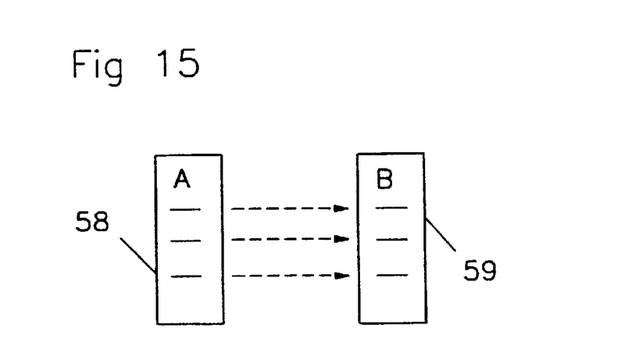
FIG. 15 is a table used in the code converting circuit shown in FIG. 14.

FIG. 14 illustrates circuits included in the multinetwork telephone 1, 41 which provides access to one and the same service in the mobile telephony network and in the fixed telephone network, by the user keying-in one and the same key sequence. FIG. 14 illustrates a keypad 55 whose individual keys are connected to a keypad decoder 56. The keypad decoder 56 includes logic and counters, coder, D/A-converter and an oscillator. When a key, or button, is depressed the keypad decoder forms row and column addresses for the selected key. The counters and decoders use these addresses to select unique frequencies based on the oscillator frequency. The row and column coders generate a digital word having the requisite frequency, and individual row and column D/A-converters convert the digital word to corresponding voltage levels. These synthesized tones are mixed together in an operational amplifier and the desired output signal comprised of two tones is obtained on the output of the keypad decoder 56, this signal being passed to the network switching circuit 11. The network switching circuit 11 is connected to the second communication device 9 directly and to the first communication device 8 for communication in the mobile telephony network via a code converting circuit 57. The code converting circuit 57 converts the tone sequence to a new sequence of tones that is compatible with service call sequences and telephone numbers in the mobile telephone network. This code conversion is effected with the aid of data tables stored in a memory (not shown) in the code converting circuit 57. A first memory area 58 contains a first table A for those tone codes that correspond to the services available in the fixed telephone network, while another memory area 59 contains those tone codes which correspond to the same service in the mobile telephony network. Similarly, the same service can be activated in the fixed network and in the mobile telephone network with the same keying sequence as that used to activate the service in the fixed network. Thus, the user need not be concerned about in which network he makes an outgoing call, since the handportable unit makes the choice automatically, and neither need he keep an account of different keying sequences for the same service in the different networks, but need only remember the keying sequence for solely one of the networks. As a supplement to the aforesaid, the code converting circuit 57 may be constructed to add the area code number to the region or area in which the multinetwork telephone is normally used, since the mobile telephony network also requires the trunk number to be given when a local call is to be set up.

Figure 16:
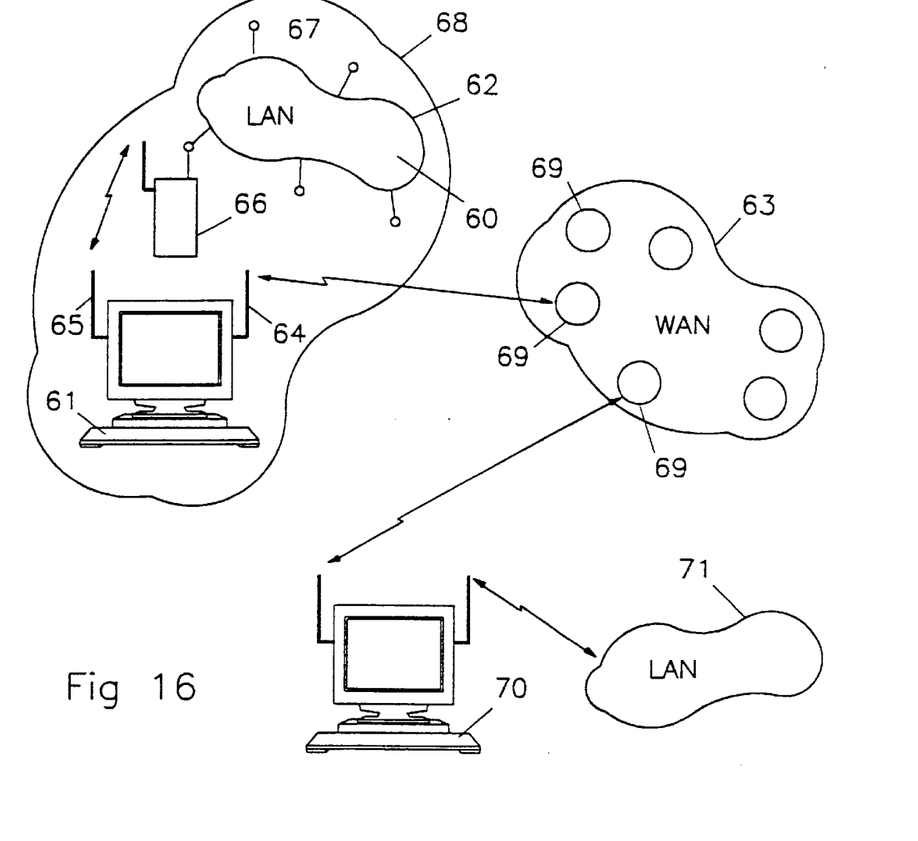
FIG. 16 illustrates a fixed local data network (LAN) and a mobile data network which has a wide covering area (WAN), and a multi-terminal for use in these two networks.

FIG. 16 illustrates a local area data network 60 (LAN) to which a number of mobile multiterminals 61 are connected, these terminals being able to communicate with one another over a coaxial cable 62. Only one multiterminal has been shown connected to the local terminal, for reasons of clarity. The multiterminal 61 can also communicate by radio with a mobile data network 63 having a wide coverage area (wide area network, WAN). Each multiterminal 61 includes a computer which has a first communication device, illustrated symbolically by a first antenna 64, for communication in the network 63, and a second communication device, illustrated symbolically by a second antenna 65, for communication in the local data network 60. The first communication device 64 includes known radio communication hardware and software, for instance equipment such as that used for communication in the mobitex network. The second communication device 65 includes known equipment for data transmission via radio, infrared light or ultrasound to a base unit 6 which is connected to one of a number of access points 67 common to the local data network 62. Distinct to the local data network 60, the multiterminal 61 therewith has cordless access and the user of the multiterminal is able to move freely within the local coverage area, symbolized by the area 68, for all base units 66 that are connected to the local network 60. From this aspect, the local network 60 is corresponded by a business-cordless network in the telephony world. Each multiterminal 61 also has a first detecting device, similar to the detector circuit 10 in FIG. 2, for detecting a number of states of the first communication device and for sending electric signals corresponding to said states to a network switching circuit (not shown) provided in the multiterminal 61 and corresponding to the network switching circuit 11 in FIG. 2. Each multiterminal 61 also includes a second detecting device which functions to detect a number of states of the second communication device and which sends to the network switching circuit electric signals that correspond to said states. The network switching circuit (not shown), the detector circuit (not shown) and the first and the second communication devices 64, 65 in the multiterminal are connected to one another in a manner corresponding to the units 11, 10, 9, 8 in FIG. 2 and have corresponding functions. The network switching circuit, not shown in the Figure, is intended to activate the second communication device depending on whether or not the multiterminal 61 is located within the local coverage range 68. In all other cases, the network switching circuit is intended to activate the first communication device for communication towards the mobile data network 63. The mobile data network includes a number of nodes 69 to which other multiterminals 70 connected, via radio connections. Only one such connection has been shown for reasons of clarity. Although not necessary, such multiterminals 70 may be connected to other local data networks 71, via cordless-access in the same way as the multiterminal 61.

Figure 17:
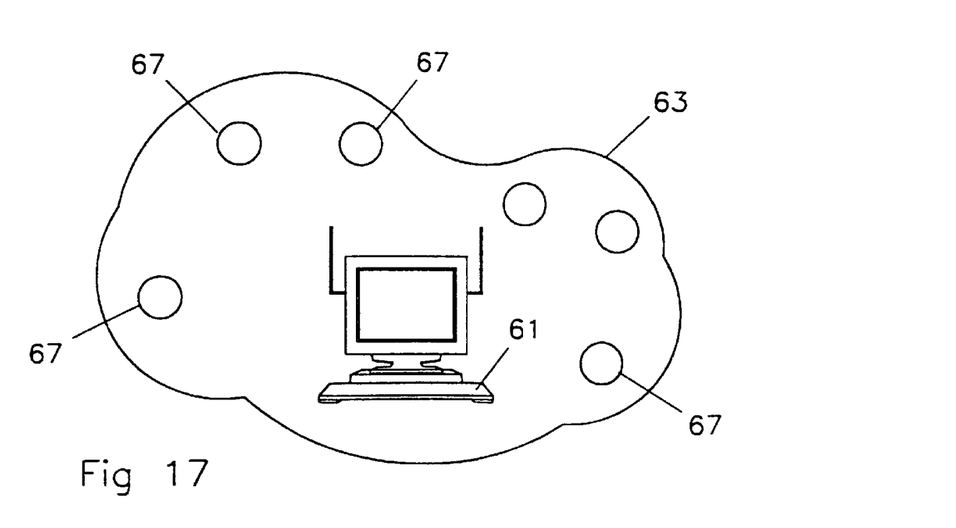
FIG. 17 illustrates the mobile data network of FIG. 16 and a number of fixed local networks.

FIG. 17 is intended to show that a multiterminal 61 may be connected to one of a number of local networks 62, and that when the terminal is moved away from the local coverage area of such a network, the first communication device establishes contact with the mobile data network 63 automatically, without action on the part of the user. Thus, a user is able to log-in his multiterminal on a local network, for instance when he switches on his multiterminal at his place of work in the morning. The user works with the computer and can take the computer with him as he moves from room to room, with the computer constantly logged-in on the local network 62. When the user then leaves the building and, for instance, sits in his car, the detector circuit will detect that the multiterminal has lost contact with the local network 62. The network switching circuit activates the first communication device and the multiterminal 61 now has contact with the mobile data network 63. The mobile data network will thus function as a background network to the fixed local network 60, in the same way as the mobile telephony network 21 in FIG. 3 serves as a background network to the fixed network 15, 16 or 17.

I claim:

1. A multi-network communication method for telecommunication in an environment which includes a plurality of different telecommunications networks and a multi-network terminal provided for communication in each of said telecommunications networks, said multi-network terminal monitoring said networks in order to detect with which network the terminal currently has access, said method comprising the steps of:

said multi-network terminal dynamically selecting, based upon the networks that are currently accessible, an accessible network in which communication shall take place;

said multi-network terminal initiating, when changing networks for communication, annulment of any diversion service earlier active in said selected network, and in each remaining non-selected network initiating, in a coordinated manner with said annulment step, activation of a diversion service so that an incoming call in any of said non-selected networks, the incoming call having said multi-network terminal as a destination, is redirected to the multi-network terminal in the selected network.

2. A multi-network communication method in accordance with claim 1, wherein said multi-network terminal comprises (a) a hand held unit provided with a function that makes the hand held unit operate as a mobile telephone and (b) a stationary telephone instrument, wherein said multi-network terminal initiates said diversions in said currently accessible networks upon insertion of said hand held unit into a battery-charging unit and upon removing of the hand held unit from said battery-charging unit.

3. A multi-network communication method in accordance with claim 1, wherein said multi-network terminal comprises a hand held unit provided with functionality and hardware that makes the hand held unit operate as a mobile telephone unit and as a cordless telephone unit, wherein said multi-network terminal initiates said diversions in said accessible networks upon insertion of the hand held unit into a battery-charging unit and upon removal of the hand held unit from said battery-charging unit.

4. A multi-network communication method in accordance with claim 3, wherein said hand held unit initiates said diversions when the cordless telephone unit leaves the area covered by a base station of said cordless telephone unit.

5. A multi-network communication method in accordance with claim 1, wherein said multi-network terminal initiates an outgoing connection in said selected network.

6. A multi-network communication method in accordance with claim 1, wherein said multi-network terminal initiates an outgoing connection in any of said currently accessible networks.

7. A multi-network communication method in accordance with claim 1, wherein said multi-network terminal comprises a computer provided with a first communication device for communication in a local area network and a second communication device for communication in a wide area network, said multi-network terminal initiating said diversions when the multi-network terminal leaves the area covered by a base station of said first communication device.

* * * * *